(12) United States Patent
Naden

(10) Patent No.: US 7,225,952 B2
(45) Date of Patent: Jun. 5, 2007

(54) KETTLE WITH TILT-OPEN SPOUT CLOSURE

(75) Inventor: Mark C. Naden, New York, NY (US)

(73) Assignee: Helen of Troy Limited, St. Michael (BB)

( * ) Notice: Subject to any disclaimer, the term of this patent is extended or adjusted under 35 U.S.C. 154(b) by 226 days.

(21) Appl. No.: 10/929,906

(22) Filed: Aug. 30, 2004

(65) Prior Publication Data

US 2006/0043124 A1    Mar. 2, 2006

(51) Int. Cl.
*A47G 19/14* (2006.01)

(52) U.S. Cl. .................... 222/465.1; 222/473

(58) Field of Classification Search ............ 222/465.1, 222/470–472, 469, 475.1, 473, 454, 1; 220/317, 220/318; 126/349
See application file for complete search history.

(56) References Cited

U.S. PATENT DOCUMENTS

| | | | |
|---|---|---|---|
| 1,486,802 A | 3/1924 | Royse | |
| 2,102,349 A | 12/1937 | Baron | |
| 2,169,239 A | 8/1939 | Hacmac | |
| 2,294,594 A | 9/1942 | Bloomfield | |
| 2,624,493 A | 1/1953 | Porter | |
| 2,718,338 A | 9/1955 | Cicero | |
| 4,756,442 A | 7/1988 | Halm et al. | |
| 5,135,128 A | 8/1992 | Kuhn | |
| 5,307,950 A | 5/1994 | Li | |
| 6,006,959 A | 12/1999 | Naden et al. | |
| 6,540,120 B2 | 4/2003 | Lebowitz | |

FOREIGN PATENT DOCUMENTS

WO       WO 01/03556    *   1/2001   .............. 222/465.1

* cited by examiner

*Primary Examiner*—Lien M. Ngo
(74) *Attorney, Agent, or Firm*—Seyfarth Shaw LLP

(57) ABSTRACT

A vessel has a body defining a storage unit and a spout communicating with the storage unit, a spout closure coupled to the body at a first coupling location for movement between open and closed positions, a handle having a front end movably coupled to the spout closure at a second coupling location and a rear end spaced from the body, and support structure fixed to the body and movably supporting the rear end of the handle at a third coupling location, the coupling locations being arranged so that the spout closure is unresponsive to a vertical lifting force exerted on the handle, but opens in response to a tipping force exerted on the handle by a user's hand.

25 Claims, 3 Drawing Sheets

KETTLE WITH TILT-OPEN SPOUT CLOSURE

BACKGROUND

This application relates to closures for spouted vessels, such as tea kettles and the like, and relates in particular to techniques for controlling opening and closing of the spout closure.

Various types of kettle spout closures have heretofore been provided, as well as various techniques for controlling opening and closing of the spout closure. In particular, prior arrangements have been provided with handles which move relative to the vessel body in response to lifting forces applied by a user's hand, for opening the spout closure. While such arrangements operate in a satisfactory manner, they have the drawback of maintaining the spout closure in an open position as long as a lifting force is exerted on the handle. This may be disadvantageous, since it may permit liquid to splash out of the spout while the vessel is being carried. This could be dangerous if the vessel contains hot liquid, such as boiling water.

Vessels, such as tea kettles, have also been provided with spout closures coupled to a pendulum-like counterweight mechanism which is acted upon by gravity to tend to maintain the counterweight mechanism vertical so that, when the vessel is tipped for pouring, the relative movement between the counterweight and the vessel causes the spout closure to open. Such arrangements have, however, been complicated, the counterweight mechanism necessitating additional parts which may make the vessel difficult to store or clean, if located outside the vessel body, or may interfere with the contents of the vessel, if located within the vessel body.

SUMMARY

There is disclosed herein a spouted vessel with a spout closure which avoids disadvantages of prior arrangements, while affording structural and operating advantages.

In an embodiment, a vessel comprises a body defining a storage unit and having a spout communicating with the storage unit, a spout closure coupled to the body at a first coupling location for movement between a closed position closing the spout and an open position opening the spout, a handle having a front end coupled to the spout closure for movement relative thereto at a second coupling location and a rear end spaced from the body, and support structure fixed to the body and movably supporting the rear end of the handle at a third coupling location, the first and second and third coupling locations being arranged so that the spout closure is responsive to a force exerted on the handle by a user's hand to tip the body in a pouring direction for movement from the closed position to the open position, but is unresponsive to a vertical lifting force exerted on the handle by the user's hand.

In an embodiment, the handle may have a hollow rear portion, the third coupling location being disposed within the hollow rear portion.

In an embodiment, the vessel may have a handle assembly with movable and fixed portions, the movable portion being movably coupled to the spout closure at the second coupling location and to the fixed portion at the third coupling location, being fixed to the body and movably coupled to the front portion.

There is also disclosed a method of opening a normally closed spout closure of a spouted vessel body, comprising movably coupling a handle to the spout closure and to the body, vertically lifting the handle without opening the closure, and causing the spout closure to open by using the handle to tilt the body for pouring from the spout.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figures 1, 2:
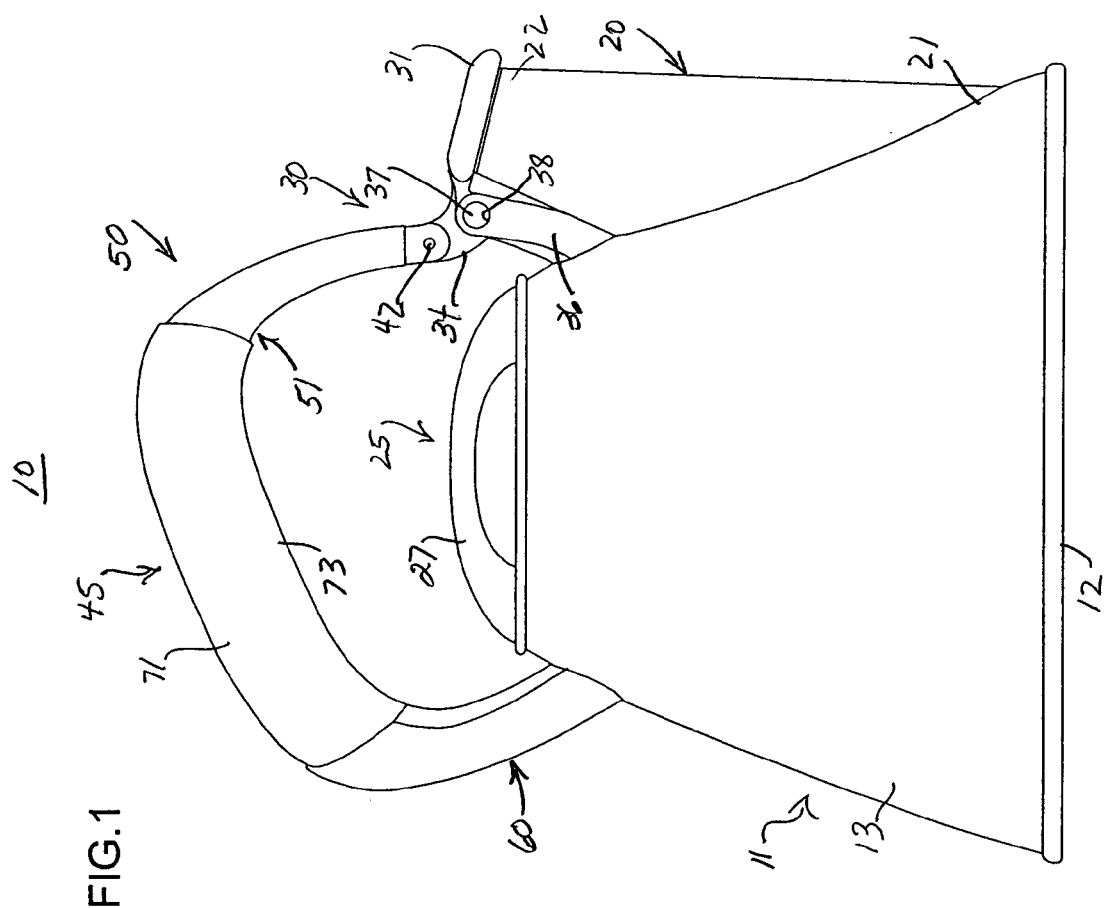
FIG. 1 is a side elevational view of a kettle with a spout closure disposed in the closed position.
FIG. 2 is a rear perspective view of the kettle of FIG. 1.
Figures 3, 4:
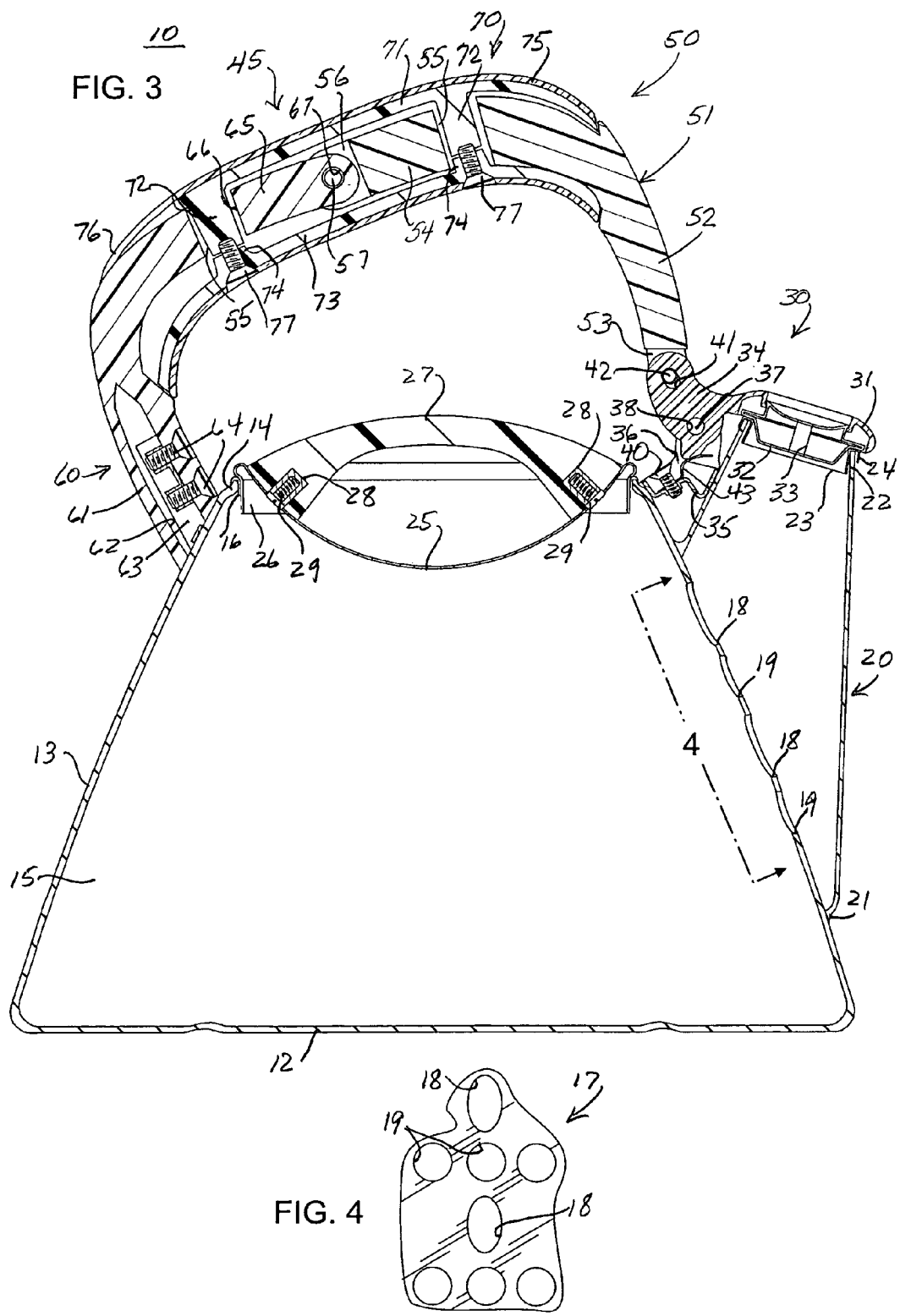
FIG. 3 is an enlarged view of the kettle of FIG. 1 in vertical section.
FIG. 4 is a fragmentary view taken generally along the line 4—4 in FIG. 3.

Referring to FIGS. 1 and 2, there is illustrated a vessel in the form of a tea kettle 10 having a body 11 with a substantially flat, circular bottom wall 12 and an upstanding sidewall structure 13 which, as illustrated, is generally frustoconical in shape, although it will be appreciated that it could have any of a number of different shapes. Referring also to FIG. 3, the sidewall structure 13 terminates at an open upper end forming a top opening 14 and cooperates with the bottom wall 12 to define a storage unit 15. The top opening 14 is defined by a substantially cylindrical rim flange 16 at the upper end of the sidewall structure 13. Referring to FIGS. 3 and 4, there is formed through the sidewall structure 13 an array of apertures 17, which may include vertically aligned oval apertures 18 and rows of horizontally aligned circular aperture 17. However, it will be appreciated that other aperture shapes and other pattern arrangements of the apertures could be utilized.

Integral with the sidewall structure 13 is an elongated spout 20 having a wide base 21 which encompasses the array of apertures 17 and is fixedly secured to the sidewall structure 13 in a fluid-tight manner, by any suitable means. The spout 20 is generally frustoconical in shape and tapers to a narrow discharge end 22. In the case of an enamel kettle, there may be disposed in the discharge end 22 an annular liner 23, provided at its upper end with a radially outwardly and downwardly extending lip flange 24, which is generally L-shaped in transverse cross section and hooks over the distal end of the spout 20 to retain the liner 23 in place. The tea kettle 10 is also provided with a circular cover 25, concave as viewed from above, provided at its periphery with a generally cylindrical, flexible and resilient skirt flange 26 dimensioned for frictional engagement with the rim flange 16 of the body 11 for retaining the cover in place in a closed position illustrated in the drawings, for closing the top opening 14. Extending diametrically across the cover 25 is a handle 27 provided at its opposite ends with inserts 28 for receiving suitable fasteners, such as screws 29, for securing the handle to the cover 25.

The spout 20 is provided with a closure assembly 30, which includes a circular lid 31 having an insert portion 32 dimensioned to fit inside the discharge end 22 of the spout 20 while the remainder of the lid 31 rests against the liner lip flange 24 for covering the discharge end of the spout 20 in a closed position illustrated in FIGS. 1–3. A whistle aperture 33 may be formed through the lid 31 in a known manner. Integral with the lid 31 and projecting rearwardly therefrom is a lever arm 34 adapted to be pivotally coupled to the kettle body 11. More specifically, a bracket 35 is fixed at the upper junction between the spout 20 and the sidewall structure 13. A clevis 36 is mounted on the bracket 35 and has upwardly projecting arms which receive therebetween an intermediate portion of the lever arm 34, being pivotally coupled thereto by a pivot pin 37 which extends through an aperture 38 in the lever arm 34 and through complementary apertures (not shown) in the arms of the clevis 36 and defines a first coupling location. The clevis 36 may be secured to the bracket 31 by any suitable means. Formed through the lever arm 34 adjacent to its rear end is an elongated slot 41 which receives therethrough a pivot pin 42 which defines a second coupling location. A leaf spring 43 may be clamped to the bracket 31 by a screw 40 so as to bear against the underside of the intermediate portion of the lever arm 34 and bias it toward rotation in a clockwise direction about the pivot pin 37, as viewed in FIG. 3.

The tea kettle 10 also includes a handle assembly, generally designated by the numeral 45, which includes a movable handle 50 and fixed support structure 60. The handle 50 includes a front portion 51 which has a leg 52 provided at its lower front end with a clevis 53 which receives therebetween the rear end of the lever arm 34 and is pivotally coupled thereto by the pivot pin 42, which is received through complementary apertures (not shown) in the legs of the clevis 53. The front portion 51 of the handle is generally L-shaped, the leg 52 being integral at its upper end with a rearwardly extending arm 54 having a plurality of generally circular apertures 55 extending therethrough from an upper side to an underside thereof. A clevis 56 is formed at the rear end of the arm 54 and is provided with complementary apertures (not shown) for receiving a pivot pin 57 at a third coupling location.

The support structure 60 is also generally L-shaped and includes an upstanding base 61 having a generally axial cavity 62 formed in the lower end thereof for receiving a projection 63 which is fixed on the outer surface of the sidewall structure 13 at a location diametrically opposite the spout 20, the base 61 being fixedly secured to the projection 60, as by screws 64. Integral with the base 61 at its upper end is a forwardly projecting arm 65, which has formed therethrough a cylindrical aperture 66 which may be generally parallel to the apertures 55 in the handle 50. The forward distal end of the arm 65 is received between the legs of the clevis 56 and has a hole 67 therethrough for receiving the pivot pin 57 to pivotally couple the support structure 60 to the handle 50. Thus, it can be seen that the handle assembly 45 cooperates with the closure assembly 34 for spanning the top opening 14 of the tea kettle 10.

The handle 50 also includes a grip assembly 70, which is fixed to the front portion 51. The grip assembly 70 includes a generally semi-cylindrical upper member 71 having a plurality of depending projections or posts 72, which respectively extend into the apertures 55 in the arm 54 and the aperture 66 in the support structure 60, and a generally part-cylindrical lower member 73 having upstanding short projections 74 which respectively mate with the projections 72 and may be fixedly secured thereto, as by screws 77, for securing the upper and lower members 71 and 73 together. Thus, it can be seen that the upper and lower members 71 and 73 cooperate to form a generally tubular rear portion of the handle 50, which encompasses the arm 54 and projects rearwardly therefrom to encompass the arm 65 of the support structure 60. The upper member 71 may be provided with an elongated slot 76 at the rear end thereof. The outer surfaces of the upper and lower members 71 and 73 may be covered with a grip sheath 75, which may be formed of a suitable elastomeric material, such as that sold under the trademark SANTOPRENE, to afford frictional gripping and cushioning characteristics for engagement with a user's hand. It can be seen that the handle 50, including the front portion 51 and the grip assembly 70 fixed thereto, are pivotally movable relative to the support structure 60 at the third coupling location defined by the pivot pin 57. Considerable clearance is afforded between the projections 72 and 74 and the aperture 66 to accommodate this movement.

Figure 5:
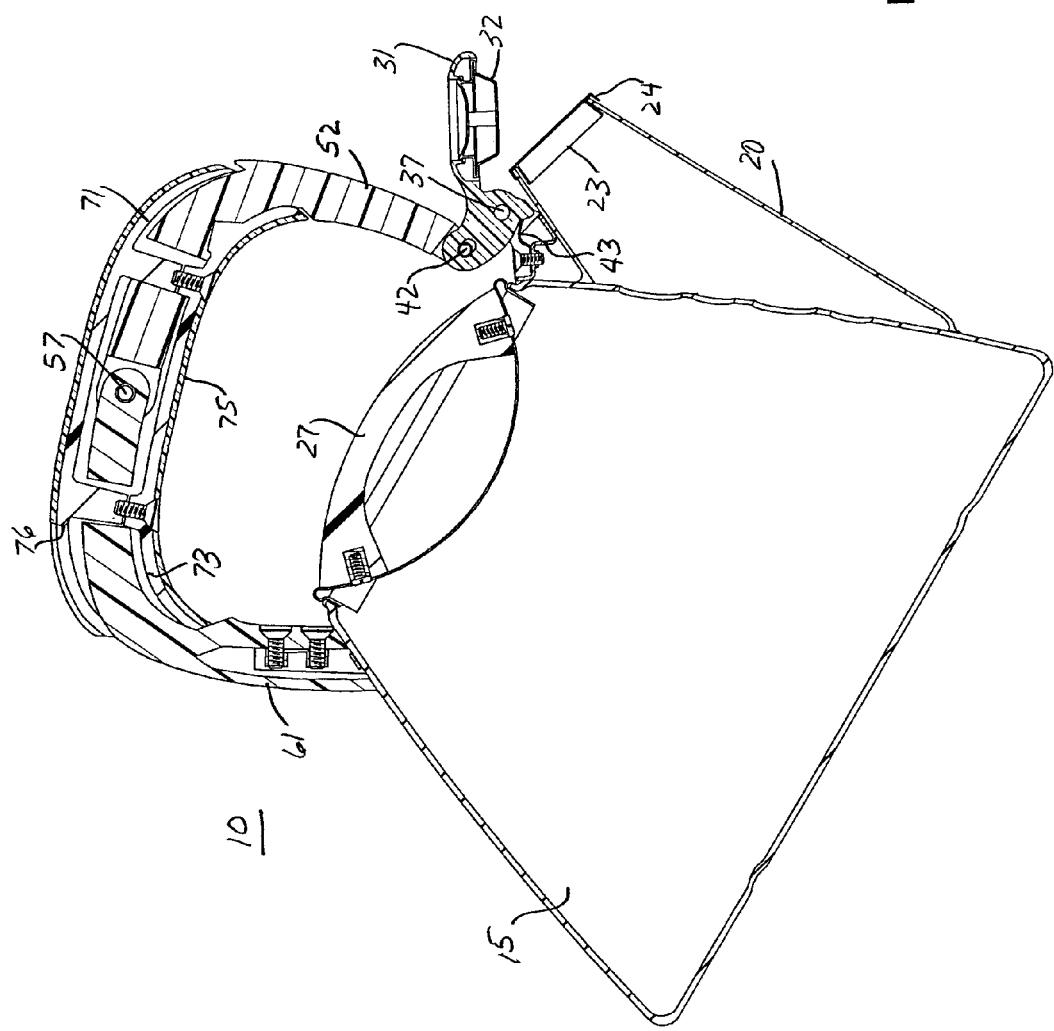
FIG. 5 is a reduced view similar to FIG. 3, with the kettle tipped for pouring and the spout closure in its open position.

Referring now in particular to FIGS. 3 and 5, it can be seen that the parts are arranged so that, when the tea kettle 10 is sitting upright on its bottom wall 12, the lid 31 is disposed in a normal closed position, illustrated in FIG. 3, closing the spout 20 so as to inhibit the escape therefrom of liquid contents of the storage unit 15. It is a significant aspect of the tea kettle 10 that, when it is lifted vertically, as by a user grasping the handle 50 and imparting a vertical lifting movement thereto, there is no effect on the closure assembly 30, and the lid 31 will remain in its closed position. Thus, the kettle 10 can be carried from place to place by the handle while minimizing the chance of spillage of contents from the spout 20. This advantage results from the unique arrangement of the coupling locations defined by the pivot pins, and the support of the handle 50 adjacent to its rear end on the support structure 60. Thus, the upward lifting movement on the handle 50 tends to exert a generally vertically upward force on the pivot pin 42, which tends to pivot the lever arm 34, if at all, in a generally clockwise direction, as viewed in FIG. 3, which tends to hold the lid 31 in its closed position.

However, when it is desired to dispense the contents of the tea kettle 10 by pouring through the spout 20, the user, while grasping the handle 50, will tip the tea kettle 10 forwardly, as indicated in FIG. 5. In response to this movement, the weight of the kettle 10 and its contents will tend to move it in a generally counterclockwise direction, as viewed in FIG. 5, about the axis of the pivot pin 42, against the tipping force being exerted by the user's hand on the handle 50. This will cause a slight pivotal movement of the handle 50 in a clockwise direction about the axis of the pivot pin 57 which will, in turn, cause a pivotal movement of the lever arm 34 in a counterclockwise direction about the axis of the pivot pin 37 for pivoting the lid 31 to an open position, illustrated in FIG. 5, to permit pouring from the spout 20. When the tea kettle 10 is returned to its upright position, illustrated in FIG. 3, these forces and motions will be reversed, and the lid 31 will return to its normal closed position of FIG. 3.

In a constructional model of the tea kettle 10, the body 11, the spout 20, the cover 25 and the pivot pins may be formed as suitable metals, while the handles 27 and 50 and the support structure 60 may be formed of suitable thermally insulating materials, such as suitable plastics or other materials. While the disclosed embodiment is in the nature of a tea kettle, it will be appreciated that the principles of the invention could apply to any handled vessel with a lidded spout.

From the foregoing, it can be seen that there has been provided an improved spouted vessel with a spout closure which pivots between open and closed positions about an axis, which is so disposed relative to pivotal couplings between a handle and handle support structure and between the handle and the closure assembly, that the spout closure will automatically open when the kettle is tipped in a pouring motion, but will remain closed when the kettle is lifted by its handle.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vessel comprising:
    a body defining a storage unit and having a spout communicating with the storage unit,
    a spout closure coupled to the body at a first coupling location for movement between a closed position closing the spout and an open position opening the spout,
    a handle having a front end coupled to the spout closure for movement relative thereto at a second coupling location and a rear end spaced from the body, and
    support structure fixed to the body and movably supporting the rear end of the handle at a third coupling location,
    the first and second and third coupling locations being arranged so that the spout closure is responsive to a force exerted on the handle by a user's hand to tip the body in a pouring direction for movement from the closed position to the open position, but is unresponsive to a vertical lifting force exerted on the handle by the user's hand.

2. The vessel of claim 1, wherein the body has a refill opening therein communicating with the storage unit, and further comprising a cover for the refill opening.

3. The vessel of claim 2, wherein the handle and the support structure cooperate to span the refill opening.

4. The vessel of claim 1, wherein the handle is pivotally coupled to the spout closure and to the support structure.

5. The vessel of claim 1, wherein the third coupling location is spaced forwardly from the rear end of the handle.

6. The vessel of claim 1, wherein the spout closure includes a lid for covering a discharge end of the spout in the closed position.

7. The vessel of claim 6, wherein the spout closure includes an insert portion receivable in the discharge end of the spout in the closed position.

8. The vessel of claim 1, wherein the spout closure includes a lid for covering and uncovering a discharge end of the spout and a pivot arm extending rearwardly from the lid, the second coupling location being disposed adjacent to a distal rear end of the pivot arm and the first coupling location being disposed between the lid and the second coupling location.

9. The vessel of claim 8, wherein the second coupling location is disposed between the first and third coupling locations.

10. A vessel comprising:
    a body defining a storage unit and having a spout communicating with the storage unit,
    a spout closure coupled to the body at a first coupling location for movement between a closed position closing the spout and an open position opening the spout,
    a handle movably coupled to the spout closure at a second coupling location and having a hollow rear portion, and
    handle support structure fixed to the body and movably coupled to the handle at a third coupling location within the hollow portion,
    the coupling locations being arranged so that the spout closure is responsive to a force exerted on the handle by a user's hand to tip the body in a pouring direction for movement from the closed position to the open position, but is unresponsive to a vertical lifting force exerted on the handle by the user's hand.

11. The vessel of claim 10, wherein the handle includes a first portion coupled to the spout closure and a tubular portion encompassing the first portion and projecting rearwardly therefrom.

12. The vessel of claim 11, wherein the tubular portion includes upper and lower portions fixedly secured together and to the first portion of the handle.

13. The vessel of claim 12, wherein the first portion of the handle has apertures therethrough, the upper and lower portions including projections which cooperate to extend through the apertures.

14. The vessel of claim 10, wherein the handle includes a frictional grip portion.

15. The vessel of claim 10, wherein the handle and the spout closure are adapted for pivotal movement at each of the coupling locations.

16. The vessel of claim 15, wherein the second coupling location is disposed between the first and third coupling locations.

17. A method of opening a normally closed spout closure of a spouted vessel body comprising:
    moveably coupling a handle to the spout closure and to the body,
    vertically lifting the grip portion without opening the closure, and
    causing the spout closure to open by using the handle to tilt the body for pouring from the spout.

18. The method of claim 17, further comprising pivotally coupling the spout closure to the vessel body at a first coupling location for movement between the open and closed positions.

19. The method of claim 18, wherein the handle is pivotally coupled to the spout closure at a second coupling location and to the body of the third coupling location, the second coupling location being disposed between the first and third coupling locations.

20. The method of claim 19, wherein the third coupling location is on support structure fixed to the body.

21. A vessel comprising:
    a body defining a storage unit and having a spout communicating with a storage unit,
    a spout closure coupled to the body at a first coupling location for a movement between a closed position closing the spout and an open position opening the spout, and
    a handle assembly having movable and fixed portions,
    the movable portion being movably coupled to the spout closure at a second coupling location,
    the fixed portion being fixed to the body,
    the movable portion being movably coupled to the fixed portion at a third coupling location,
    the second coupling location being disposed between the first and third coupling locations so that the spout closure is responsive to a force asserted on the handle assembly by a user's hand to tip the body in a pouring direction for movement from a closed position to the open position, but is unresponsive to a vertical lifting force asserted on the handle assembly by the user's hand.

22. The vessel of claim 21, wherein the fixed portion includes support structure fixed to the body.

23. The vessel of claim 21, wherein the movable portion includes a first portion coupled to the spout closure and a tubular portion encompassing the first portion and projecting rearwardly therefrom.

24. The vessel of claim 23, wherein the tubular portion includes upper and lower portions fixedly secured together and to the first portion of the handle.

25. The vessel of claim 21, wherein the second coupling location is disposed between the first and third coupling locations.

* * * * *